United States Patent
Kassai

(10) Patent No.: US 8,484,429 B2
(45) Date of Patent: Jul. 9, 2013

(54) APPARATUS AND METHOD TO COPY DATA VIA A REMOVABLE STORAGE DEVICE

(75) Inventor: Kunihiko Kassai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 267 days.

(21) Appl. No.: 12/813,595

(22) Filed: Jun. 11, 2010

(65) Prior Publication Data
US 2010/0332746 A1 Dec. 30, 2010

(30) Foreign Application Priority Data
Jun. 30, 2009 (JP) .................................. 2009-156094

(51) Int. Cl.
*G06F 12/00* (2006.01)
(52) U.S. Cl.
USPC ............................ 711/165; 711/113; 707/660
(58) Field of Classification Search
USPC ............................ 711/130, 113, 165; 707/660
See application file for complete search history.

(56) References Cited

U.S. PATENT DOCUMENTS

| | | | |
|---|---|---|---|
| 7,127,568 B2 * | 10/2006 | Watanabe et al. | 711/154 |
| 8,024,515 B2 * | 9/2011 | Auerbach et al. | 711/113 |
| 8,065,466 B2 * | 11/2011 | Toshine | 711/4 |
| 2004/0139129 A1 | 7/2004 | Okuyama et al. | |
| 2007/0271430 A1 | 11/2007 | Maki et al. | |
| 2008/0126437 A1 | 5/2008 | Chiba | |
| 2008/0275928 A1 * | 11/2008 | Shuster | 707/205 |
| 2011/0179241 A1 * | 7/2011 | Suzuki et al. | 711/162 |

FOREIGN PATENT DOCUMENTS

| | | |
|---|---|---|
| JP | 5-40610 | 2/1993 |
| JP | 10-508967 | 9/1998 |
| JP | 11-212845 | 8/1999 |
| JP | 2004-139217 | 5/2004 |
| JP | 2007-310448 | 11/2007 |
| JP | 2008-134712 | 6/2008 |
| WO | WO 97/09676 | 3/1997 |

OTHER PUBLICATIONS

Japanese Patent Office Notification of Reasons for Refusal mailed May 10, 2011, for corresponding Japanese Patent Application 2009-156094.

* cited by examiner

*Primary Examiner* — Kalpit Parikh
(74) *Attorney, Agent, or Firm* — Staas & Halsey LLP

(57) ABSTRACT

An apparatus capable of communicating with another apparatus including a first writing unit for writing data into a plurality of recording mediums housed in a first housing, a first storage, has a first reading unit for reading out data from a plurality of recording mediums housed in a second housing for housing the recording mediums storing data written by the first writing unit, a second reading unit for reading out data from the first storage, a second storage for storing cache data of the plurality of the recording mediums housed in the second housing, a controller unit for enabling the first and second reading units to read out data on the basis of the determined area, and a second writing unit for writing data read out by the first reading unit and the second reading unit into the second storage.

12 Claims, 11 Drawing Sheets

FIG. 3

| FIELD NAME | VALUE |
| --- | --- |
| ARCHIVE ID | ArchiveID1 |
| ARCHIVE SOURCE FILE NAME | Data. dat |
| ARCHIVE SOURCE SERVER NAME | Server1 |
| ARCHIVE USER ID | User1 |
| ARCHIVE EXECUTION POLICY NAME | Policy1 |
| DATA RETAINING POSITION | DISK1/sub1 |
| DATA RETAINING SECONDARY MEDIUM NAME | LT0075 |
| FINAL ACCESS DATE AND HOUR | 20080105120500 |
| ⋮ | ⋮ |

APPARATUS AND METHOD TO COPY DATA VIA A REMOVABLE STORAGE DEVICE

CROSS-REFERENCE TO RELATED APPLICATION

This application is based upon and claims the benefit of priority of the prior Japanese Patent Application No. 2009-156094, filed on Jun. 30, 2009, the entire contents of which are incorporated herein by reference.

FIELD

The present art relates to a technique for moving data stored in one device to another device.

BACKGROUND

Recently, information technology has been frequently utilized in various business fields. As a business is carried forward, various pieces of data involving the business are generated and most of the data so generated is retained for recording of the details of the business concerned and for later utilization.

For example, in a medical system, a retention period for which data on each patient such as images indicative of a result of inspection performed on the patient, a text indicative of a result of medical examination performed on the patient and information on medicines prescribed to the patient is to be retained is provided by law. Thus, in the medical system, long-term retention of mass data is indispensable.

As media for retaining data, a hard disk, a magnetic tape, a semiconductor memory and the like may be given. In many cases, a magnetic tape which is relatively low in cost per storage capacity is used to retain mass data.

However, since the magnetic tape is of a sequential access type, it is not suited to retain data frequent and random access to which is necessary.

In a medical system of the above mentioned type, data is stored every time each medical examination is finished and the stored data is read out every time the next medical examination is to be performed. Therefore, random access to the data concerned is required and long-term retention of the mass data which has been generated consequently is also required.

In order to meet the above mentioned requirements, such a system is proposed that it includes a magnetic tape and a hard disk so as to store mass data in the magnetic tape and to store data which is high in access frequency in the randomly accessible hard disk, thereby attaining both mass data storage and random accessibility.

In a system of the above mentioned type that long-term retention of data is indispensable, it may sometimes occur that in the case that the amount of stored data is increased and residual storage capacity of a storage medium for storing data is decreased accordingly or in the case that the service life of an ever used system has expired, the ever used system has to be replaced with a new system.

In replacing the ever used system with the new system, it is necessary to move data stored in the ever used system to the new system. In the above mentioned situation, a magnetic tape is highly stably used to store data even when the data is to be retained for a long time period and, in addition, a magnetic tape is a matured medium standard of which is hardly updated, so that the possibility that it will be used as it is also in the future is high. Therefore, movement of data stored in the magnetic tape is possible simply by moving the magnetic tape used in the ever used system to the new system as it is.

On the other hand, the possibility that a hard disk will fail is increased with increasing its use time. Therefore, it is desirable to move data stored in the hard disk to the new system by reading data out of the hard disk in the ever used system and storing the data then in a new hard disk installed in the new system.

However, a technique for moving data to a new system by storing the data then in a new medium has such a problem that data movement takes much time. The time required for data movement is proportional to the data amount. In the case that mass data has to be moved as in the case in a medical system as described above, in some cases, for example, several days to several months may be took.

SUMMARY

According to an aspect of an embodiment, an apparatus capable of communicating with another apparatus including a first writing unit for writing data into a plurality of recording mediums housed in a first housing, a first storage for storing cache data of the plurality of the recording mediums housed in the first housing, and a table for managing data stored in the another apparatus, has a first reading unit for reading out data from a plurality of recording mediums housed in a second housing for housing the recording mediums storing data written by the first writing unit of the another apparatus, a second reading unit for reading out data from the first storage by communicating with the another apparatus, a second storage for storing cache data of the plurality of the recording mediums housed in the second housing, a determining unit for determining an area of the plurality of recording mediums housed in the second housing to be read out data by the first reading unit and an area of the first storage to be read out data by the second reading unit in reference to the table, a controller unit for enabling the first reading unit to read out data on the basis of the determined area of the plurality of recording mediums, and the second reading unit to read out data on the basis of the determined area of the first storage, and a second writing unit for writing data read out by the first reading unit and the second reading unit controlled by the controller into the second storage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating a management table;

DESCRIPTION OF EMBODIMENTS

Next, embodying aspects of the present art will be described with reference to the accompanying drawings. Incidentally, configurations of the embodiments of the present art which will be described hereinbelow are merely examples and the present art is not limited to these configurations of the embodiments.

Figure 1:
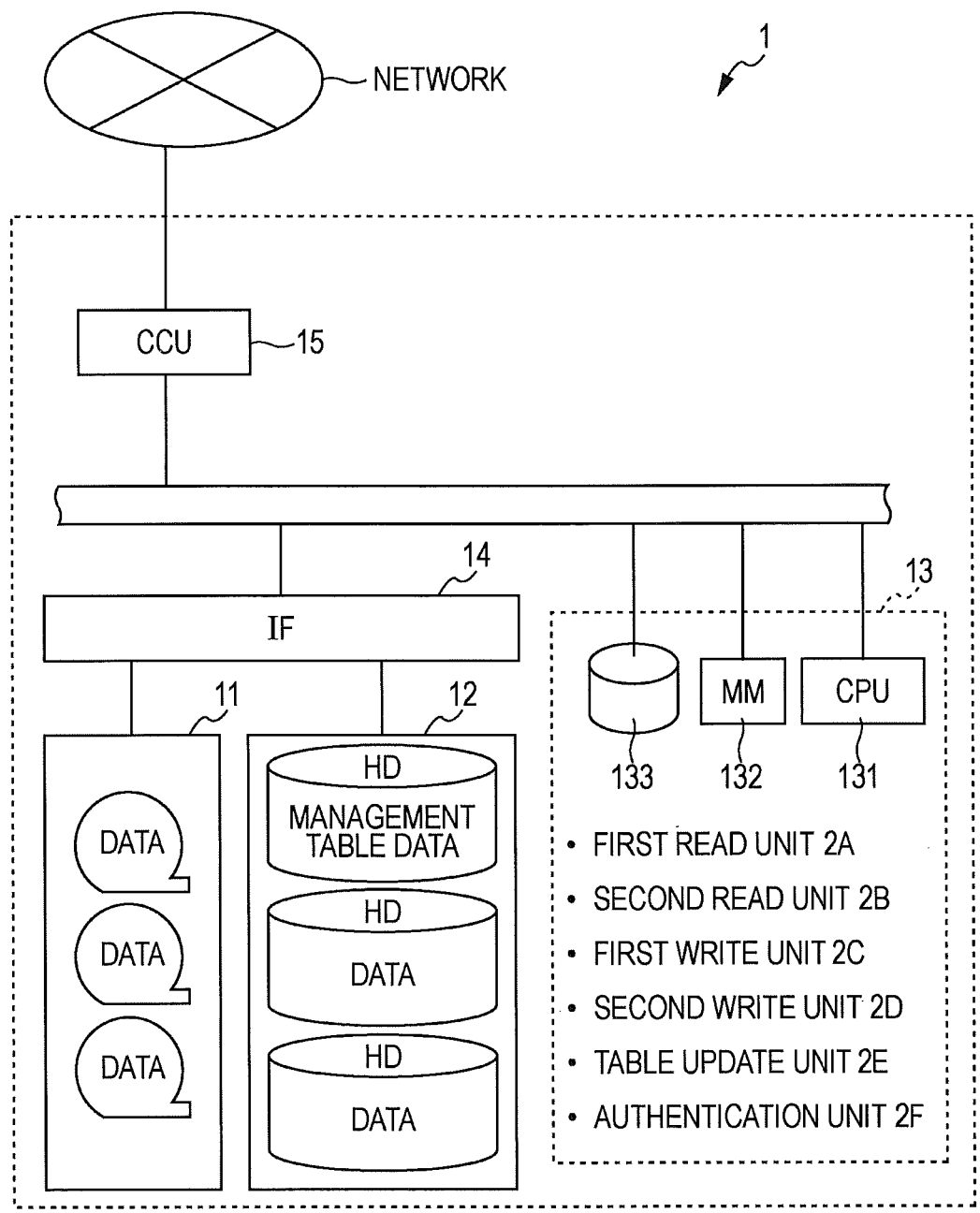
FIG. 1 is a schematic diagram of a storage server of a move source.

Embodiment 1:

FIG. 1 is a schematic diagram of a storage server (storage device) 1. The storage server 1 includes a first storage unit 11, a second storage unit 12, a data management unit 13, an interface 14 and a communication control unit 15. The second storage unit 12 includes a management table data and data.

The first storage unit 11 has a mass storage medium and stores all pieces of data therein. The first storage unit 11 according to this embodiment is a magnetic tape device that uses a magnetic tape as a storage medium.

The second storage unit 12 has a randomly accessible storage medium and temporarily stores part of the data stored in the first storage unit 11. The second storage unit 12 according to this embodiment is a hard disk drive that uses a hard disk as a storage medium.

The interface 14 connects the data management unit 13 with the first storage unit 11 and the second storage unit 12 and relays data to be written from the data management unit 13 into the first storage unit 11 or the second storage unit 12 and data which has been read out of the first storage unit 11 or the second storage unit 12. The interface 14 is, for example, an iSCSI (Internet Small Computer System Interface) or a host bus adapter of a fiber channel (Fibre Channel).

The communication control unit 15 is an interface through which the storage server 1 is connected with another device and controls communication between the storage server 1 and the device connected therewith. The communication control unit 15 is constituted of a network card through which the storage server 1 is connected with another device, for example, over a network.

The data management unit 13 includes a CPU (Central Processing Unit) 131, a main memory 132 and a storage unit 133.

An operating system (OS) and application software are installed in the storage unit 133 of the data management unit 13.

The CPU 131 of the data management unit 13 appropriately reads the OS or the application software out of the storage unit 133 and executes the OS or the software to arithmetically process information which has been received from the interface 14, the communication control unit 15 and an input/output unit 16 and information which has been read out of the storage units 11, 12 and 133. In addition, the data management unit 13 arithmetically processes the above mentioned information, thereby functioning as a first read unit 2A, a second read unit 2B, a first write unit 2C, a second write unit 2D, a table update unit 2E and an authentication unit 2F. That is, the storage server 1 according to this embodiment is an information processing device (a computer) that executes a program and processes information in accordance with the program concerned, thereby implementing a function of each unit in software.

In the case that a request that data be read (hereinafter, referred to as a data read request) has been received via the communication control unit 15, the CPU 131 which functions as the first read unit 2A sends a command that data be read (hereinafter, referred to as a data read command) conforming to the data read request to the interface 14 and reads data out of the first storage unit 11 via the interface 14.

In the case that a data read request has been received via the communication control unit 15, the CPU 131 which functions as the second read unit 2B sends a data read command conforming to the data read request to the interface 14 and reads data out of the second storage unit 12 via the interface 14.

In the case that data and a request that the data be written (hereinafter, referred to as a data write request) have been received via the communication control unit 15, the CPU 131 which functions as the first write unit 2C sends the data and a command that the data be written (hereinafter, referred to as a data write command) to the interface 14 and writes the data into the first storage unit 11.

In the case that data and a data write request have been received via the communication control unit 15, the CPU 131 which functions as the second write unit 2D sends the data and a data write command to the interface 14 and writes the data into the second storage unit 12.

The CPU 131 functions as the table update unit 2E to update a management table into which information on respective pieces of data is registered.

In the case that a request that access be gained (hereinafter, referred to as an access request) has been received from the business server 3, the CPU 131 which functions as the authentication unit 2F extracts user information included in the access request and judges, in accordance with a policy, whether access using the user information is permitted with reference to the management table.

Figure 2:
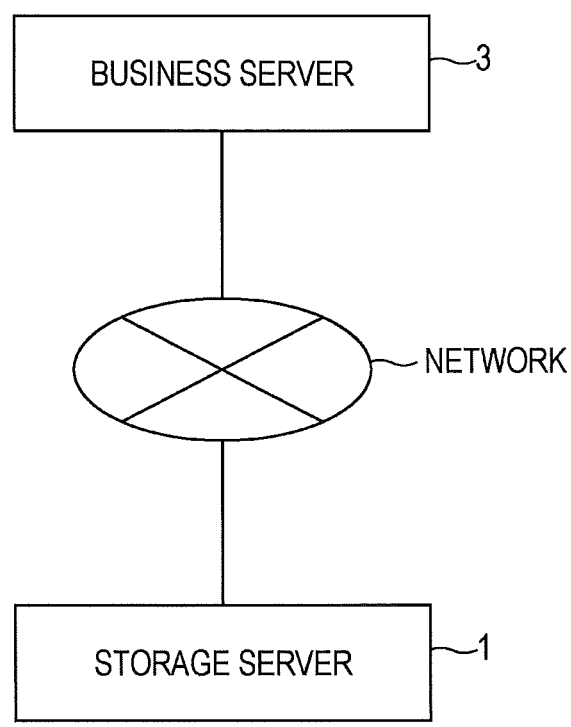
FIG. 2 is a diagram illustrating a state in which a storage server is connected with a business server.

The storage server 1 is connected with another device over a cable or a network. FIG. 2 is a diagram illustrating a state in which the storage server 1 is connected with the business server 3 over a network.

The storage server 1 performs data storage and data reading on the basis of a request given from the business server 3.

The storage server 1 operates to store all pieces of data writing of which has been requested from the business server 3 in the first storage unit 11. However, the first storage unit 11 uses a magnetic tape medium, that is, the unit 11 is a device of the sequential access type and hence it takes much time to read arbitrary data out of the first storage unit 11.

Thus, of respective pieces of data which have been written into the first storage unit 11, some pieces of data which are high in reference frequency are also stored in the randomly accessible second storage unit 12. That is, the second storage unit 12 is used as a cache of the first storage unit 11.

For example, in a medical system, it is desired to retain data for at least five years as provided by law or to retain data for five or more years for researches. That is, data for five or more years is stored in the first storage unit 11. In the above mentioned situation, the first write unit 2C may compress the data to be written in order to store the largest possible amount of data in the first storage unit 11.

The storage server 1 then operates to store data for the past two years of the data which has been stored in the first storage unit 11 also in the second storage unit 12. In many cases, data which will be necessary in usual medical treatment is data which has been quite recently prepared. In a medical system, in general, data used for medical examinations, preparation of precipitations and other business management is data which has been prepared in the past several months. Therefore, if data for the past two years is stored in the second storage unit 12, the storage server 1 will be able to read most data requested from the business server 3 out of the second storage unit 12 and to immediately send the business server 3 the data. In addition, even when data which has been prepared two or more years ago is requested, the storage server 1 will possibly read it out of the first storage unit 11 in one hour or so. Even if data reading out of the first storage section 11 takes time, data reading out of the first storage section 11 is hardly requested and hence almost no problem will occur.

As described above, owing to the provision of a first storage device which allows mass data storage at a low cost and a randomly accessible second storage device, the storage server 1 attains both mass data storage and a high access speed.

In the storage server 1 according to this embodiment, for data management, an ID is appended to each piece of data and information on an attribute of each piece of data and its storage location is registered in the management table corresponding to each ID. FIG. 3 is a diagram illustrating an example of the management table according to this embodiment.

An archive ID is information used to identify each piece of data. The archive ID may be in the form of characters which will be readily identified such as alphanumeric characters or in the form of consecutive numbers for sorting, or may include information indicative of the type of data concerned for grouping and is expressed, for example, as "Archive ID1".

An archive source file name is the name of a file for each piece of data. The archive source file name may be designated by a user or using the business server 3 and is expressed, for example, as "Data1.dat". The archive source file name may be used for identification of each piece of data together with the archive ID.

An archive source server name is the name of a server that performs writing or reading of each piece of data and is expressed, for example, as "Server 1".

An archive user ID is the ID of a user who uses each piece of data and is expressed, for example, as "User 1". A plurality of archive user IDs may be set and may respectively indicate, for example, a data organizer, a data updater, a readable user and a writable user.

An archive execution policy name is the name of a policy which is applied when each piece of data is accessed and is expressed, for example, as "Policy 1". The policy indicates necessity of authentication and conditions for authentication and is stored in the storage unit 133 or the second storage unit 12. As examples of conditions of authentication, "Only a user of an ID matching an archive user ID is permitted to access" and "Update by a user of an ID matching a writable user archive user ID is permitted and only reading is permitted to a user of an ID not matching the writable user archive user ID" may be given.

A data retaining position indicates the storage location of each piece of data. The data retaining position is information or a so-called pass name indicating a hierarchical structure into which data concerned is stored in order of a device name and a holder name, for example, such as "DISK1/sub1".

A data retaining secondary medium name indicates the name of a medium that stores data concerned. As the data retaining secondary medium name, for example, a name which is inherently used in the system is set such that a medium concerned may be specified with the name even when it is moved to another storage server.

The access date and hour indicates the data and hour of final access to each piece of data. For example, the Christian Era, the month, the day, the hour, the minute and the second are listed, for example, in the form of 20080105120500. Incidentally, access to the data concerned is performed to read, write or update the data. The access date and hour is not limited to the date and hour of the final access to the data concerned and may be an access history in which the past access dates and hours counted for a predetermined term are recorded.

In the case that data has been freshly stored in the first storage unit 11 or the second storage unit 12, the table update unit 2E freshly registers information on the data concerned into the management table. In the case that data has been deleted from the first storage unit 11, the table update unit 2E deletes information on the data concerned from the management table. In the case that access has been gained to data stored in the first storage unit 11 or the second storage unit 12, the table update unit 2E updates the access date and hour of the data concerned.

The business server 3 according to this embodiment specifies each piece of data with the archive ID to request to gain access to the data concerned. That is, when the business server 3 requests the storage server 1 to read "Archive ID1", the data management unit 13 of the storage server 1 reads the corresponding file or "Data1.dat" out of "DISK1/sub1 indicative of the data retaining position and sends the business server 3 "Data1.dat".

Then, in the case that the service life of the storage server 1 has expired and hence data in the storage server 1 has to be moved to a new storage server 2, the data is moved from the storage server 1 of the move source to the new storage server 2 of the move destination.

Figure 4:
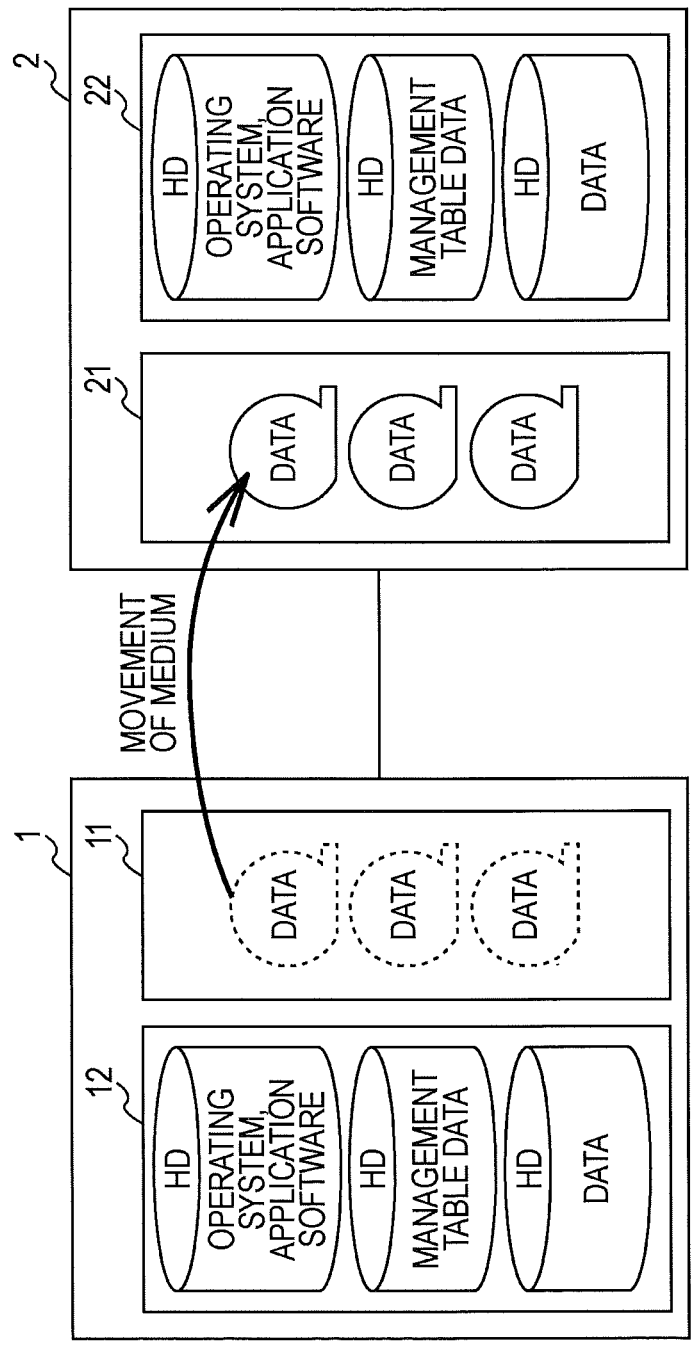
FIG. 4 is a diagram illustrating a state in which a storage server of a move source is connected with a storage server of a move destination.

FIG. 4 is a diagram illustrating a state in which the storage server 1 of the move source is connected with the storage server 2 of the move destination for data movement. The storage server 2 to which the data concerned has been moved is connected with the business server 3 in place of the storage server 1 and gains access to data in accordance with a request from the business server 3. The second storage unit 12 includes an operating system application software, a management table data, and data.

Figure 5:
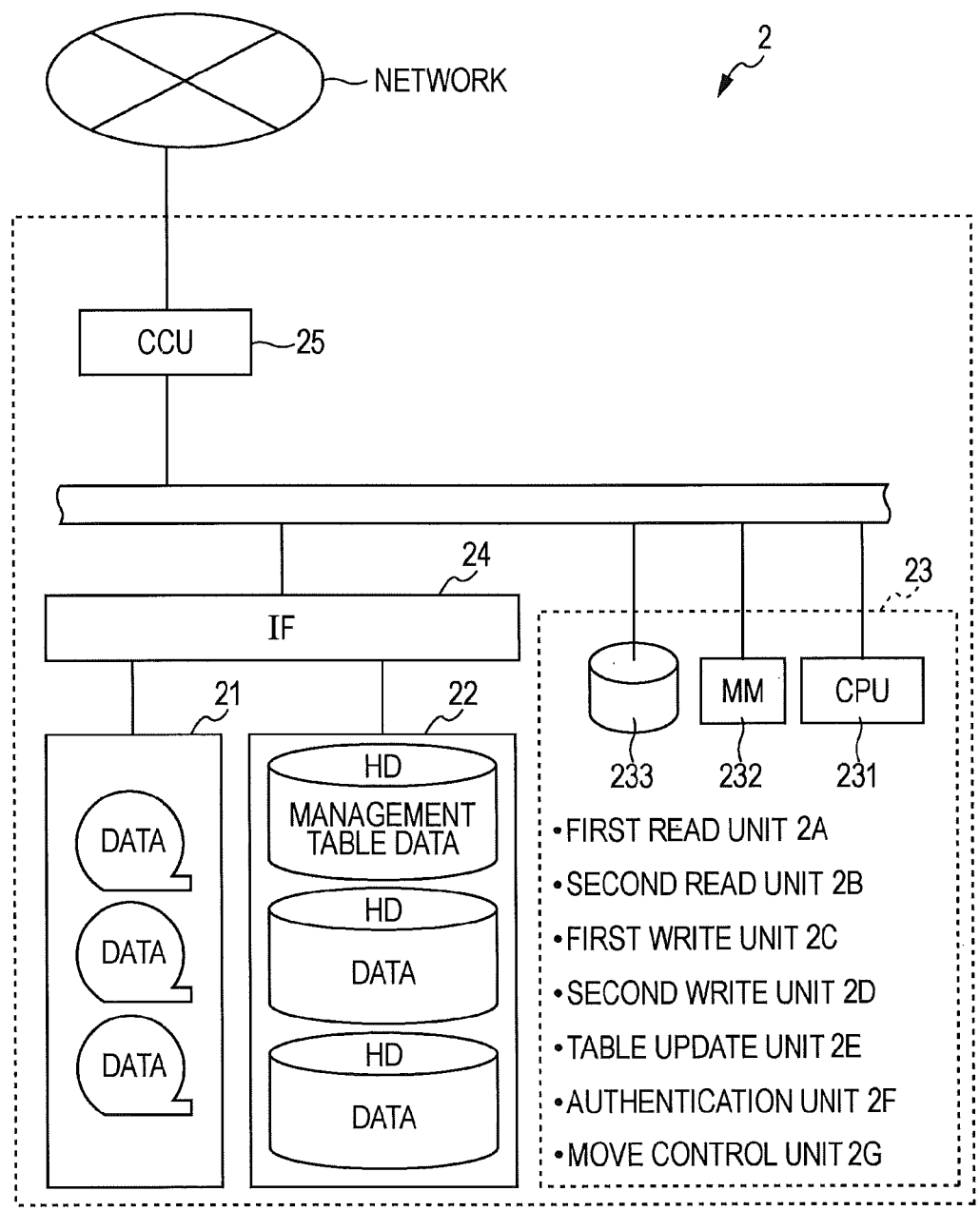
FIG. 5 is a schematic diagram of a storage server of a move destination.

FIG. 5 is a schematic diagram of the storage server 2 having a data moving function.

The storage server 2 includes a first storage unit 21, a second storage unit 22, a data management unit 23, an interface 24 and a communication control unit 25. The second storage unit 22 includes a management table data and data.

The first storage unit 21 includes a mass storage medium and stores all pieces of data. The first storage unit 21 according to this embodiment is a magnetic tape device that uses a magnetic tape as a storage medium.

The second storage unit 22 includes a randomly accessible storage medium and temporarily stores part of the data stored in the first storage unit 21. The second storage unit 22 according to this embodiment is a hard disk drive that uses a hard disk as a storage medium.

The interface 24 connects the data management unit 23 with the first storage unit 21 and the second storage unit 22 and relays data to be written from the data management unit 23 into the first storage unit 21 or the second storage section 22 and data which has been read out of the first storage section 21 or the second storage unit 22. The interface 24 is, for example, an iSCSI or a host bus adapter of a fiber channel.

The communication control unit 25 is an interface through which the storage server 2 is connected with another device and controls communication between the storage server 2 and the device connected therewith. The communication control unit 25 is constituted of a network card through which the storage server 2 is connected with another device, for example, over a network. In the example illustrated in FIG. 5, the communication control unit 25 connects the storage server 2 with the storage server 1 over a network and controls communication such as transmission of a data read request to the storage server 1 and reception of data which has been read out of the storage server 1.

The data management unit 23 includes a CPU (Central Processing Unit) 231, a main memory 232 and a storage unit 233.

An operating system (OS) and application software (a data moving program and others) are installed in the storage unit 233 of the data management unit 23.

The CPU 231 of the data management unit 23 appropriately reads the OS and the application software out of the storage unit 23 and executes the OS and the application software, thereby executing arithmetic processing on information received from the interface 24, the communication control unit 25 and an input/output unit 26 and information which has been read out of the storage units 21, 22 and 233. Owing to execution of the arithmetic processing, the data management unit 23 also functions as the first read unit 2A, the second read unit 2B, the first write unit 2C, the second write unit 2D, the table update unit 2E, the authentication unit 2F and a move control unit 2G. That is, the storage server 1 according to this embodiment is an information processing device (a computer) that executes a program to process information in accordance with the program concerned, thereby implementing a function of each unit in software.

In the case that a data read request has been received via the communication control unit 25, the CPU 231 which functions as the first read unit 2A sends a data read command conforming to the data read request to the interface 24 and reads data out of the first storage unit 21 via the interface 24.

In the case that a data read request has been received via the communication control unit 25, the CPU 231 which functions as the second read unit 2B sends a data read command conforming to the data read request to the interface 24 and reads data out of the second storage unit 22 via the interface 24. In addition, the CPU 231 which functions as the second read unit 2B sends a data read request to the storage server 1 via the communication control unit 25 and reads data out of the second storage unit 12 of the storage server 1.

In the case that data and a request that the data be written have been received via the communication control section 25, the CPU 231 which functions as the first write unit 2C sends the data and a command that the data be written to the interface 24 and writes the data into the first storage unit 21.

In the case that data and a request that the data be written have been received from the business server 3 or the move control unit 2G via the communication control unit 25, the CPU 231 which functions as the second write unit 2D writes the data into the second storage unit 22 via the interface 24.

The CPU 231 which functions as the table update unit 2E updates the management table into which information on each piece of data is registered.

In the case that an access request has been received from the business server 3, the CPU 231 which functions as the authentication unit 2F extracts user information included in the access request and judges in accordance with a policy whether access with the user information is permitted with reference to the management table.

The CPU 231 which functions as the move control unit 2G reads data out of the second storage unit 12 of the storage server 1 as the move source and stores the data in the second storage unit 22. That is, the CPU 231 which functions as the move control unit 2G specifies data stored in the second storage unit 12 on the move source side with reference to the management table stored in the storage server 1 and sends a command that the specified data be read to the second read unit 2B. The CPU 231 which functions as the second read unit 2B requests the storage server 1 to read the specified data on the basis of the command and receives the data conforming to the request from the storage server 1, thereby reading data out of the storage unit on the side of the storage server 1. Then, the CPU 231 which functions as the move control unit 2G sends a command that the data which has been read using the second read unit 2B be written to the second write unit 2D. Then, the CPU 231 which functions as the second write unit 2D writes the data into the second storage unit 22.

The CPU 231 which functions as the move control unit 2G reads data out of the first storage unit 21 and stores the read data in the second storage unit 22. That is, the CPU 231 which functions as the move control unit 2G specifies data stored in the second storage unit 12 on the move source side and sends a command that the specified data be read to the first read unit 2A. The CPU 231 which then functions as the first read unit 2A reads the specified data out of the first storage unit 21 on the basis of the command. The CPU 231 which then functions as the second write unit 2D writes the read data into the second storage unit 22.

As described above, the storage server 2 according to this embodiment reduces the time taken for data movement by reading the data concerned out of the first storage unit 21 installed therein in parallel with reading the data concerned out of the second storage unit 12 on the move source side.

Incidentally, a ratio of data reading out of the first storage unit 21 to data reading out of the second storage unit 22 is determined on the basis of a ratio of a speed at which the data is read out of the first storage unit 21 to a speed at which the data is read out of the second storage unit 22. That is, data read processing to be performed on both the storage units is appropriately divided such that the amount of data to be read out of one storage unit which is higher in data reading speed than another storage unit is increased and the amount of data to be read out of one storage unit which is lower in data reading speed than another storage unit is decreased. For example, in the case that the reading speed at which data is read out of the first storage unit 21 is R1 and the reading speed at which data is read out of the second storage unit 22 is R2, the amount of data to be read out of the first storage unit 21 is set to R1/(R1+R2) of the total amount of data and the amount of data to be read out of the second storage unit 22 is set to R2/(R1+R2) of the total amount. A specific example thereof will be described later with reference to FIG. 6.

Figure 6:
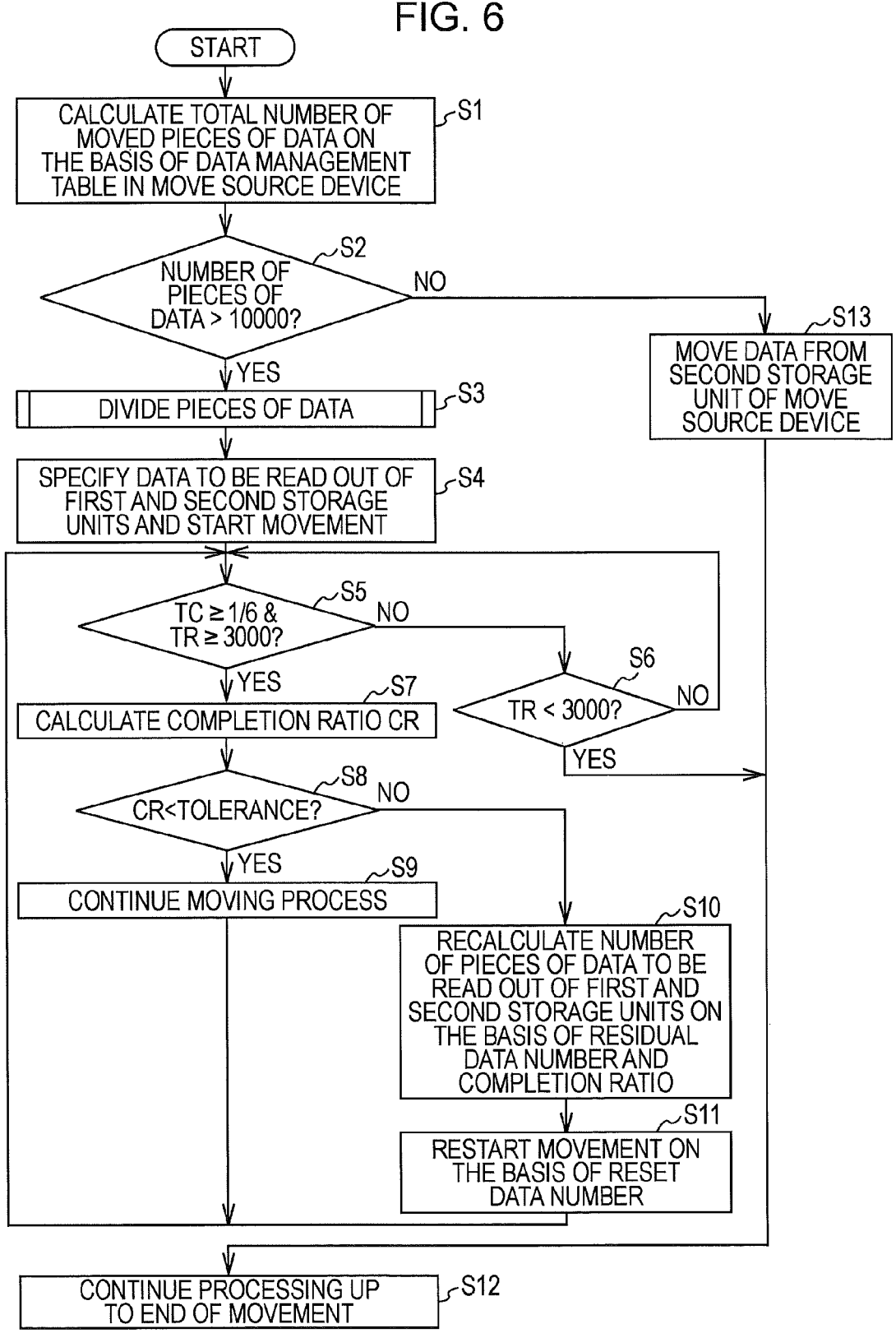
FIG. 6 is a diagram illustrating a method of moving data.

FIG. 6 is a diagram illustrating a data moving method which is executed using the storage server 2 which is a device having a data moving function on the basis of a data moving program.

In moving data, the storage server 2 is connected with the storage server 1 over a cable such as a network as illustrated in FIG. 5. A magnetic tape medium is taken out of the first storage unit 11 of the storage server 1 and is mounted on the first storage unit 21 of the storage server 2. At a moment that the magnetic tape medium has been moved to the storage server 2, all pieces of data stored in the magnetic tape medium are brought to be available in the storage server 2.

Then, when a command that data movement be started is given under the operation of an operator, the CPU 231 which functions as the move control unit 2G of the storage server 2 counts the number of pieces of data stored in the second storage unit 12, that is, the number of pieces of data to be moved with reference to the management table stored in the storage server 1 (step S1). In the example illustrated in FIG. 3, the number of pieces of data is the number of records which are discriminated from one another with the archive IDs appended thereto.

Next, the CPU 231 which functions as the move control unit 2G judges whether the number of pieces of data is larger than a predetermined number, that is, in this embodiment, whether the number of pieces of data is larger than 10000 (step S2).

In the case that the number of pieces of data is larger than the predetermined number (step S2, Yes), these pieces of data are divided in a predetermined ratio (step S3). For example, in the case that a ratio of the reading speed at which data is read out of the second storage unit 12 to the reading speed at which data is read out of the first storage unit 21 is 1:2, the move control unit 2G sets the number of pieces of data to be read out of the first storage unit 21 to ⅓ of the total number of pieces of data and sets the number of pieces of data to be read out of the second storage unit 12 to ⅔ of the total number of pieces of data.

Then, the CPU 231 which functions as the move control unit 2G specifies data to be read out such that the number of pieces of data to be read out of the first storage unit 21 and the number of pieces of data to be read out of the second storage unit 12 respectively match the numbers of pieces of data of the ratio set at step S3. In the example illustrated in the drawing, the reading speed at which data is read out of the second storage unit 12 is higher than the reading speed at which data is read out of the first storage unit 21, so that the CPU 231 which functions as the move control unit 2G specifies the data so as to read pieces of data which are high in access frequency out of the second storage unit 12 and to read pieces of data which are low in access frequency out of the first storage unit 21.

For example, the CPU 231 which functions as the move control unit 2G specifies pieces of data of the amount corresponding to ⅔ of the total amount in turn, starting from one piece of data which is newer in the access date and hour than another piece of data, on the basis of the final access dates and hours registered in the management table and sequentially sends commands to read the specified pieces of data out of the second storage unit 12 to the second read unit 2B.

The CPU 231 which then functions as the second read unit 2B sequentially reads the specified pieces of data out of the second storage unit 12 of the storage server 1 on the basis of the commands and then the CPU 231 which functions as the write unit moves the data to the move destination by sequentially writing the read pieces of data into the second storage unit 22 on the move destination side.

The CPU 231 which functions as the move control unit 2G specifies pieces of data of the amount corresponding to ⅓ of the total amount in turn, starting from one piece of data which is older in the access date and hour than another piece of data and sequentially sends commands to read the specified pieces of data out of the first storage unit 21 to the first read unit 2A. Next, the CPU 231 which functions as the first read unit 21 sequentially reads the specified pieces of data out of the first storage unit 21 on the basis of the commands. Then, the CPU 231 which functions as the write unit moves the data to the move destination by sequentially writing the read pieces of data into the second storage unit 22 on the move destination side (step S4).

The CPU 231 which functions as the move control unit 2G looks the progress of data movement (step S5). For example, the CPU 231 judges whether a moved data number TC and a residual data number TR are respectively larger than predetermined numbers. For example, whether the number of pieces of data movement of which has been completed, that is, the moved data number TC is larger than the number corresponding to ⅙ of the total number of pieces of data to be moved is judged and whether the residual number of pieces of data movement of which is not yet performed, that is, the residual data number TR is larger than 3000 is judged.

In the case that one of the moved data number TC and the residual data number TR is not larger than the predetermined number (step S5, No), whether the residual data number TR is larger than the predetermined number (for example, 3000) is judged (step S6). In the case that the residual data number TR is not larger than the predetermined number (step 6, No), the process returns to step S5.

In the case that the moved data number TC and the residual data number TR are larger than the predetermined numbers at step S5, the CPU 232 which functions as the move control unit 2G determines a completion ratio CR (step S7). For example, the ratio (the completion ratio CR=the first moved data number÷the second moved data number) of the number of pieces of data written from the first storage unit 21 into the second storage unit 22) (the first moved data number) to the number of pieces of data written from the second storage unit 12 on the move source side into the second storage unit 22 on the move destination side (the second moved data number) is calculated.

The CPU 23 which functions as the move control unit 2G judges whether the completion ratio CR is in a tolerance of a predetermined ratio (step S8). For example, the reading speed at which data is read out of the second storage unit 12 varies depending on the occupation rate of the CPU and data fragmentation, so that the CPU 23 which functions as the move control unit 2G confirms whether the ratio (the completion ratio CR) at which movement of pieces of data is actually completed is in the range of ±10% (the tolerance) of a predetermined ratio.

In the case that the completion ratio CR is in the tolerance, the CPU 231 which functions as the move control unit 2G continues movement of pieces of data which have been specified at step S4 (step S9).

On the other hand, in the case that the completion ratio CR is not in the tolerance at step S8, the CPU 231 which functions as the move control unit 2G divides not-yet-moved pieces of data into groups at a predetermined ratio to determine the number of pieces of data to be read out of the first storage unit 21 and the number of pieces of data to be read out of the second storage unit 12 (step S10). Incidentally, the above mentioned predetermined ratio may be either the completion ratio CR obtained at step S7 or the same ratio as that obtained at step S3.

Then, the CPU 231 which functions as the move control unit 2G specifies pieces of data of the number to be read out of the second storage unit 12 which has been determined at step S10 in turn, starting from one piece of data which is newer in the access date and hour than another piece of data, on the basis of the management table. Then, the CPU 231 which functions as the move control unit 2G sequentially sends commands to read the specified pieces of data out of the second storage unit 12 to the second read unit 2B. Then, data movement is restarted in such a manner that the CPU 231 which functions as the second read unit 2B sequentially reads the specified pieces of data out of the second storage unit 12 of the storage server 1 on the basis of the commands and the CPU 231 which then functions as the write unit sequentially writes the read pieces of data into the second storage unit 22 on the move destination side.

In addition, the CPU 231 which functions as the move control unit 2G specifies pieces of data of the number to be read out of the first storage unit 21 which has been determined at step S10 in turn, starting from one piece of data which is older in the access date and hour than another piece of data, on the basis of the management table. Then, the CPU 231 which functions as the move control unit 2G sequentially sends commands to read the specified pieces of data out of the first storage unit 21 to the first reading unit 2A. Then, data movement is restarted in such a manner that the CPU 231 which functions as the first read unit 2A sequentially reads the specified pieces of data out of the first storage unit 21 on the basis of the commands and the CPU 231 which then functions as the write unit sequentially writes the read pieces of data into the second storage unit 22 on the move destination side (step S11).

Then, in the case that the residual data number TR becomes smaller than 3000 and "No" is given at step S5 and "Yes" is given at step S6, the CPU 231 which functions as the move control unit 2G continues processing until data movement is completed as specified at step S4 or S11 (step S12). That is, in a state in which the residual data number TR has been reduced to a value less than 3000, reconsideration of the ratio of pieces of data to be read out of the first storage unit 21 to pieces of data to be read out of the second storage unit 12 will not be so effective and hence the processing is continuously executed until the data movement is completed without calculating again the ratio.

In the case that the number of pieces of data to be moved is smaller than the predetermined number, the CPU 231 which functions as the move control unit 2G gives the read unit a command that all pieces of data stored in the second storage unit 12 on the move source side be read out of the second storage unit 12. Data movement is then performed in such a manner that the CPU 231 which functions as the read unit reads the data out of the second storage unit 12 on the move source side on the basis of the command and the CPU 231 which then functions as the write unit writes the read data into the second storage unit 22 on the move destination side. That is, in the case that the number of pieces of data to be moved is small, the CPU 231 performs data movement by reading all pieces of data out of the second storage unit 12 on the move source side without reading the data out of the first storage unit 21.

According to this embodiment, in the case that data is to be moved from the second storage unit 12 on the move source side, the time taken for the moving process is reduced by reading data out of the second storage unit 12 on the move source side simultaneously with data reading out of the first storage unit 21.

Incidentally, in the case that the speed at which data is read out of the first storage unit 21 is R1, the speed at which data is read out of the second storage unit 12 on the move source side is R2 and the speed at which data is written into the second storage unit 22 on the move destination side is W1, the relation among the respective speeds is set to be $R1+R2<W1$.

For example, even when the reading speed at which data is read out of the second storage unit 12 itself on the move source side is higher than the writing speed W1, it may sometimes occur that the reading speed R2 at which data is read out of the second storage unit 12 of the storage server 1 becomes lower than the speed W1 owing to bottleneck-like action of the network concerned. In the above mentioned case, according to this embodiment, the moving speed may be increased by reading data out of the first storage unit 21.

In the case that the second storage unit 12 on the move destination side has a plurality of storages, the total writing speed W1 of the second storage unit 12 may be made sufficiently higher than the reading speed $R1+R2$ by writing the data distributively into the plurality of storages using the write unit. An apparatus capable of communicating with another apparatus including a first writing unit for writing data into a plurality of recording mediums housed in a first housing, a first storage for storing cache data of the plurality of the recording mediums housed in the first housing, and a table for managing data stored in the another apparatus, has a first reading unit for reading out data from a plurality of recording mediums housed in a second housing for housing the recording mediums storing data written by the first writing unit of the another apparatus, a second reading unit for reading out data from the first storage by communicating with the another apparatus, a second storage for storing cache data of the plurality of the recording mediums housed in the second housing, a determining unit for determining an area of the plurality of recording mediums housed in the second housing to be read out data by the first reading unit and an area of the first storage to be read out data by the second reading unit in reference to the table, a control unit for enabling the first reading unit to read out data on the basis of the determined area of the plurality of recording mediums, and the second reading unit to read out data on the basis of the determined area of the first storage, and a second writing unit for writing data read out by the first reading unit and the second reading unit controlled by the control unit into the second storage.

Figure 7:
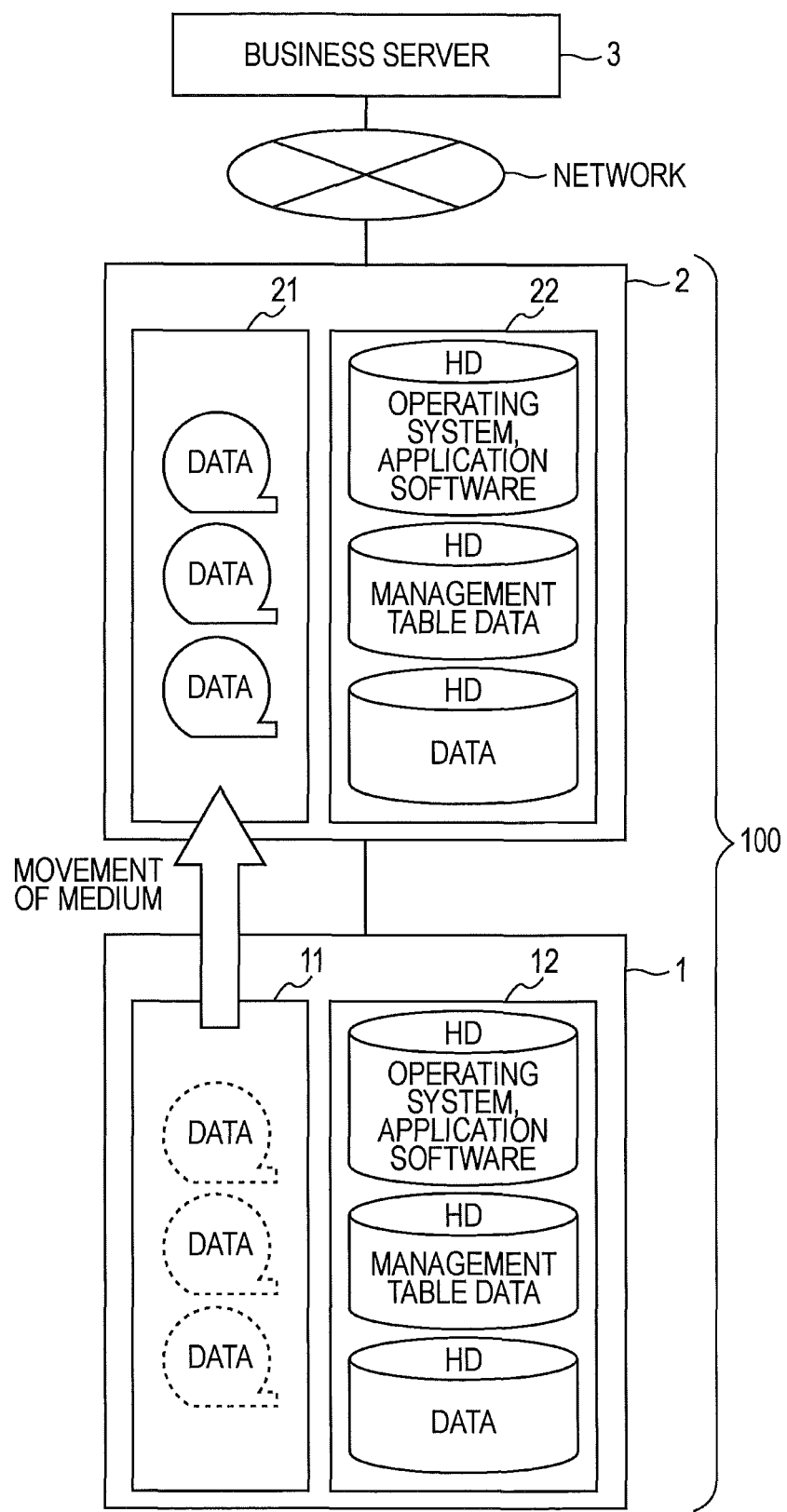
FIG. 7 is a schematic diagram of a storage system.

Embodiment 2:

FIG. 7 is a schematic diagram illustrating a storage system 100 according to an embodiment 2 of the present art. The embodiment 2 differs from the above mentioned embodiment 1 mainly in a process to be executed when a data read request has been given from the business server while data is being moved. In the example illustrated in FIG. 7, although some elements of the storage servers 1 and 2 are omitted, the storage servers 1 and 2 have the same configurations as those in the embodiment 1. In the following explanation of the embodiment 2, the same numerals are assigned to the same elements as those in the embodiment 1 and description thereof will be omitted.

The storage server 1 is connected with the business server 3 as illustrated in FIG. 2 so as to perform data reading and writing in accordance with a request from the business server 3. However, in the case that its service life has expired and hence it has to be discarded, a new storage server 2 is introduced into the system to move the data stored in the ever used storage server 1 to the new storage server 2 as illustrated in FIG. 7. Data movement is performed in the same manner as that in the embodiment 1 by connecting the storage server 1 with the storage server 2 in accordance with the procedures in FIG. 6. The storage server 2 is connected with the business server 1 and, when an access request is given from the business server 1, performs access responding to the request as an interruption process even while data is being moved.

Figure 8:
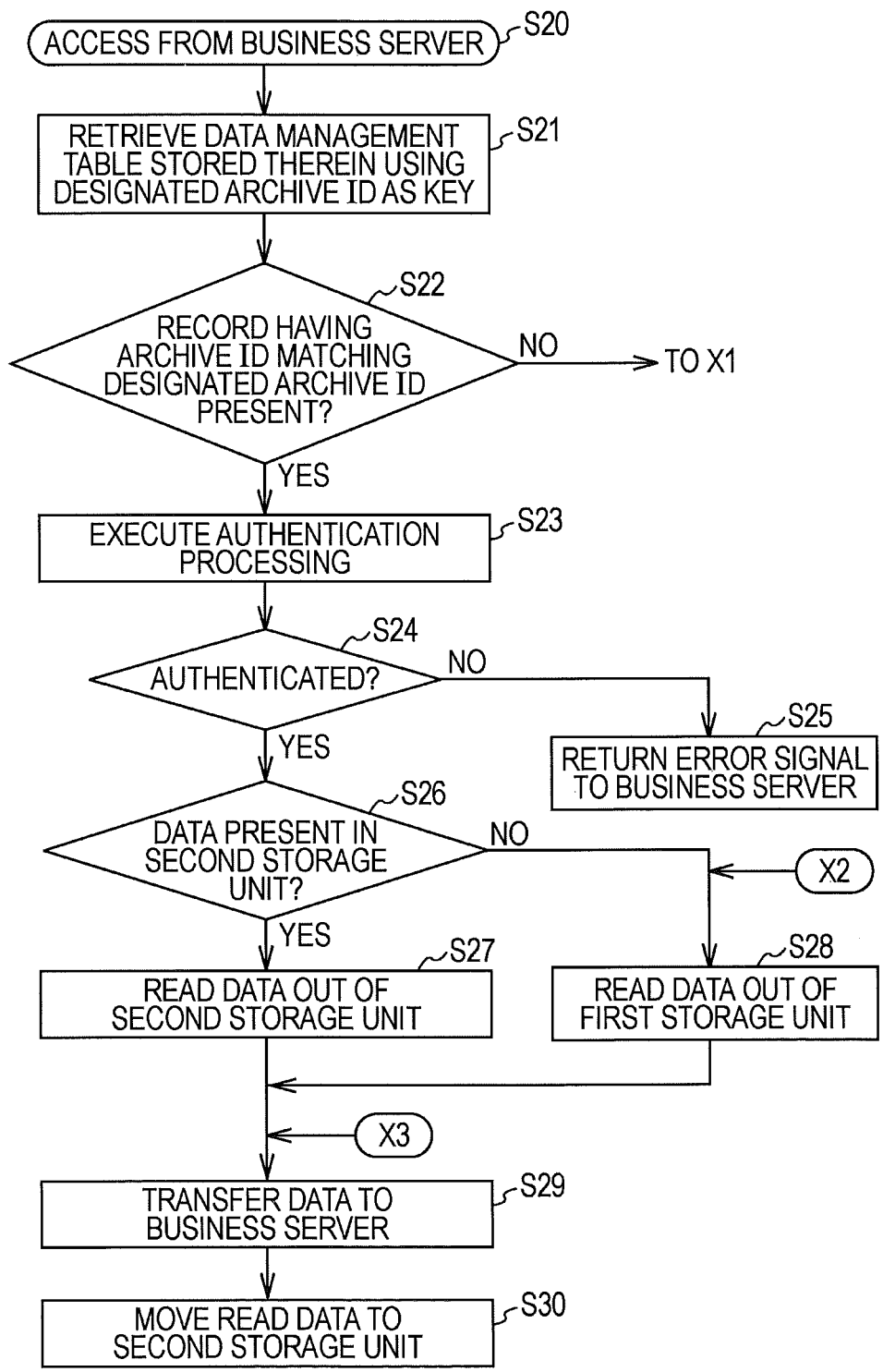
FIG. 8 is a diagram illustrating processing executed using a storage server of a move destination in the case that a read request has been received.
Figure 9:
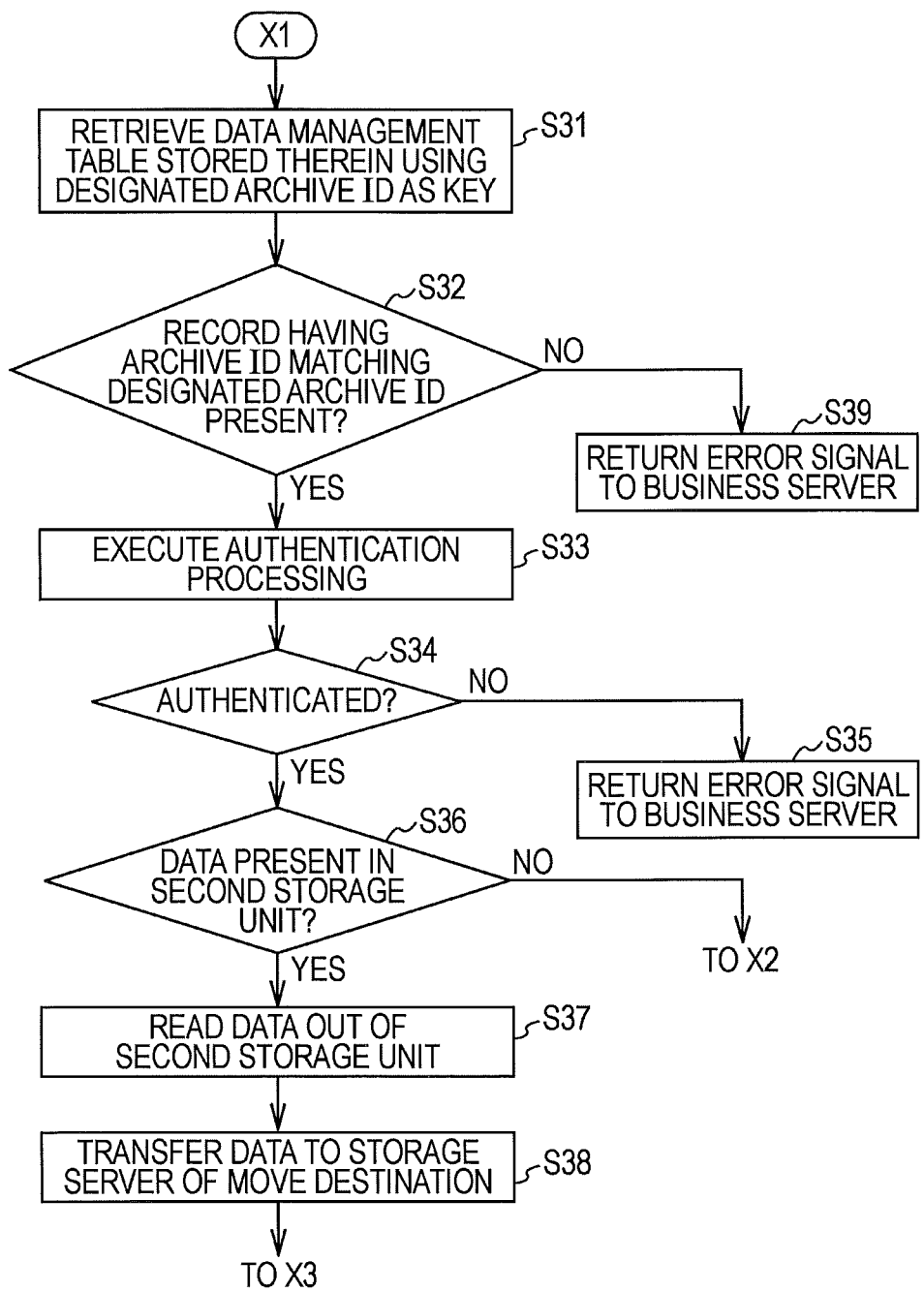
FIG. 9 is a diagram illustrating processing executed using a storage server of a move source in the case that a read request has been received.

FIG. 8 is a diagram illustrating processing executed using the storage server 2 when a data read request has been received while data is being moved. FIG. 9 is a diagram illustrating processing executed using the storage server 1 when a data read request has been received while data is being moved.

When the data read request has been received from the service server 3, the storage server 2 extracts an archive ID and a user ID with which the CPU 231 specifies data to be read from the request (step S20).

The CPU 231 which functions as the second read unit 2B retrieves a record including an archive ID which matches the extracted archive ID with reference to a data management DB stored therein (step S21).

The CPU 231 which functions as the second read unit 2B judges whether a record whose archive ID matches the extracted archive ID has been detected (step S22). When the record has been detected (step S22, Yes), the CPU 231 which functions as the authentication unit 2F executes an authentication process (step S23) in accordance with a policy indicated by the record concerned. For example, the CPU 231 reads a policy corresponding to the policy name of the record concerned out of the storage unit 233. Then, when the user ID in the received request matches the archive user ID of the detected record on the basis of the policy, authentication is settled. While when the user ID does not match the archive user ID, authentication is not settled.

The CPU 231 which functions as the second read unit 2B judges whether the authentication has been settled (step S24) and when the authentication is not settled (step S24, No), transmits an error signal to the business server 3 (step S25). In the case that the authentication has been settled (step S24, Yes), the CPU 231 which functions as the second read unit 2B judges whether data to be read is stored in the second storage unit 22 with reference to the data retaining position inf the record (step S26).

In the case that the data to be read is stored in the second storage unit 22 (step S26, Yes), the CPU 231 which function as the second read unit 2B reads the data out of the second storage unit 22 (step S27). In the case that the data to be read is not stored in the second storage unit 22 (step S26, No), the CPU 231 which functioned as the second read unit 2B then functions as the first read unit 2A and reads the data out of the first storage unit 22 (step S28).

The CPU 231 which functions as the first read unit 2A or the second read unit 2B transmits the read data to the business server 3 (step S29).

On the other hand, in the case that there is no record including the archive ID which matches the extracted archive ID, that is, data to be read is not present therein before movement is performed at step S22, the CPU 231 which functions as the second read unit 2B transmits the read request received from the business server 3 to the storage server 1 as the move source. The CPU 131 of the storage server 1 which has received the read request extracts an archive ID and a user ID from the request and retrieves a record including an archive ID which matches the extracted archive ID with reference to a data management DB stored therein (step S31).

Then, the CPU 131 which functions as the second read unit 2B judges whether a record including the archive ID which matches the extracted archive ID has been detected (step S32) and when the record is not detected (step S32, No), returns an error signal to the business server 3 via the storage server 2 (step S39). On the other hand, when the record has been detected (step S32, Yes), the CPU 131 which functions as the authentication unit 2F executes an authentication process in accordance with the policy indicated by the record (step S33).

The CPU 131 which functions as the second read unit 2B judges whether authentication has been settled (step S34) and, when the authentication is not settled (step S34, No), transmits an error signal to the business server 3 via the storage server 2 (step S35). On the other hand, when the authentication has been settled (step S34, Yes), the CPU 131 which functions as the second read unit 2B judges whether the data to be read is stored in the second storage unit 22 with reference to the data retaining position in the record (step S36).

In the case that the data to be read is stored in the second storage unit 22 (step S36, Yes), the CPU 231 which functions as the second read unit 2B reads the data out of the second storage unit 22 (step S37) and transmits the read data to the storage server 2 as the move destination (step S38). The storage server 2 which has received the data concerned transmits the data to the business server 3 (step S29) and the CPU 231 which functions as the move control unit 2G stores the data concerned in the second storage unit 22 (step S30). Then, the CPU 231 which functions as the table update unit 2E updates the management table on the basis of the date and hour that the data concerned has been stored and its retaining position (step S30). That is, the CPU 231 which functions as the move control unit 2G moves the data which has been read to the move destination and updates the contents of the management table involving the data concerned by executing the interruption process.

On the other hand, in the case that data to be read is not stored in the second storage unit 22 (step S36, No) at step S36 in FIG. 9, the CPU 131 which functions as the second read unit 2B notifies the storage server 2 of information on the management table involving the data to be read. That is, the CPU 131 notifies the storage server 2 of the information on the management table such as, for example, the archive ID, the data retaining secondary medium name and the data retaining position of the data concerned (step S38). In the storage server 2 which has received the notification, the CPU 231 which functions as the first read unit 2A read the data out of the first storage unit 21 on the basis of the information such as the data retaining secondary medium name and the data retaining position (step S28).

The CPU 231 which functions as the table update unit 2E stores the information on the management table concerned in the management table (step S30).

According to the embodiment 2, response to the data read request given from the business server 3 is possible even while data is being moved and hence the time for which data movement is performed and hence utilization of the storage server 2 is not allowed may be reduced. That is, it becomes possible for a user of the service server 3 to utilize all pieces of data stored in the storage server 2 immediately after the storage server 2 has been introduced into the system without taking the data moving term into consideration.

In addition, the data which has been read out of the move source is stored in the move destination, so that the read data is utilized with no waste and the moving speed is hardly reduced even when another process is executed while data is being moved.

Figure 10:
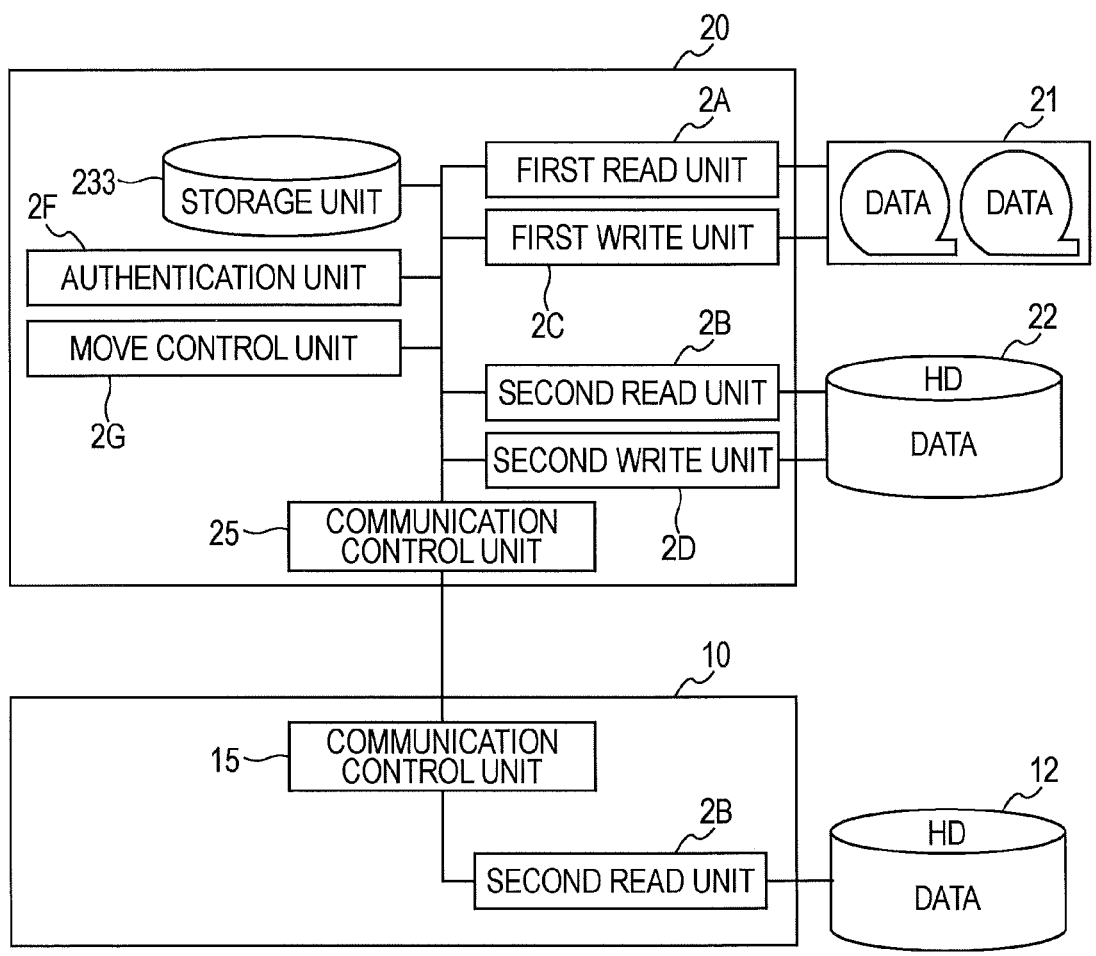
FIG. 10 is a diagram illustrating a state in which a storage sever of a move source is connected with a storage server of a move destination.

Embodiment 3:

FIG. 10 is a block diagram illustrating an example of an embodiment 3. The embodiment 3 illustrates the example in which data is moved from a storage device 10 to a storage device 20.

The storage device 10 includes the communication control unit 15 and the second read unit 2B.

The communication control unit 15 is an interface through which the storage device 10 is connected with another device and controls communication between the storage device 10 and the device connected therewith.

In the case that a data read request has been received via the communication control unit 15, the second read unit 2B reads data out of the second storage unit 12 in accordance with the received data read request.

The second storage unit 12 is a hard disk drive that uses a randomly accessible storage medium, for example, such as a hard disk and stores therein data to be moved.

The storage device 20 includes the first read unit 2A, the second read unit 2B, the first write unit 2C, the second write unit 2D, the table update unit 2E, the authentication unit 2F, the move control unit 2G, the storage unit 233 and the communication control unit 25.

The first storage unit 21 has a mass storage medium and stores all pieces of data. The first storage unit 21 according to this embodiment is a magnetic tape device that uses a magnetic tape as a storage medium.

The second storage unit 22 has a randomly accessible storage medium and temporarily stores part of the data stored in the first storage unit 21. The second storage unit 22 according to this embodiment is a hard disk drive that uses a hard disk as a storage medium.

The communication control unit 25 is an interface through which the device 20 is connected with another device and controls communication between the device 20 and the device connected therewith.

The storage unit 233 stores a management table and firmware (programs).

The first read unit 2A which has received a data read request via the communication control unit 25 reads data out of the first storage unit 21 in accordance with the read request.

The second read unit 2B which has received a data read request via the communication control unit 25 reads data out of the second storage unit 22 in accordance with the read request. The second read unit 2B sends the read request to the storage device 10 via the communication control unit 25 to read data out of the second storage unit 12 of the storage device 10.

The second writ unit 2D which has received data and a request that the data concerned be written via the communication control unit 25 or data and a request that the data concerned be written from the move control unit 2G writes the data concerned into the second storage unit 22.

The authentication unit 2F which has received an access request from the service server 3 extracts user information included in the access request and judges whether access with the user information is permitted in accordance with a policy indicated by a record with reference to a management table.

The move control unit 2G reads data out of the second storage unit 12 of the storage device 10 as the move source and stores the read data in the second storage unit 22. That is, the move control unit 2G specifies data stored in the second storage unit 12 on the move source side with reference to the management table stored in the storage device 10 and sends the second read unit 2B a command that the data concerned be read. The second read unit 2B requests the storage device 10 to read the specified data on the basis of the command and receives data conforming to the request from the storage device 10 to read data out of the storage device 10. Then, the move control unit 2G sends the second write unit 2D a command that the data which has been read using the second read unit 2B be written. The second write unit 2D writes the data concerned into the second storage unit 22.

Further, the move control unit 2G reads data out of the first storage unit 21 and stores the read data in the second storage unit 22. That is, the move control unit 2G specifies data stored in the second storage unit 12 on the move source side with reference to the management table stored in the storage device 10 and sends the first read unit 2A a command that the specified data be read. The first read unit 2A reads the specified data out of the first storage unit 21 on the basis of the command and the second write unit 2D writes the read data into the second storage unit 22.

As described above, the storage device 20 according to the embodiment 3 is capable of reducing the time taken for data movement by reading the data out of the first storage unit 21 installed therein in parallel with reading data out of the second storage unit 12 on the move source side.

Incidentally, a ratio of data reading out of the first storage unit 21 to data reading out of the second storage unit 12 may be determined on the basis of a ratio of a reading speed at which data is read out of the first storage unit 21 to a reading speed at which data is read out of the second storage unit 12. Therefore, the storage device 20 according to the embodiment 3 is capable of reading the data out of both the first storage unit 21 and the second storage unit 12 at an appropriate ratio, thereby reducing the time taken for data movement.

Figure 11:
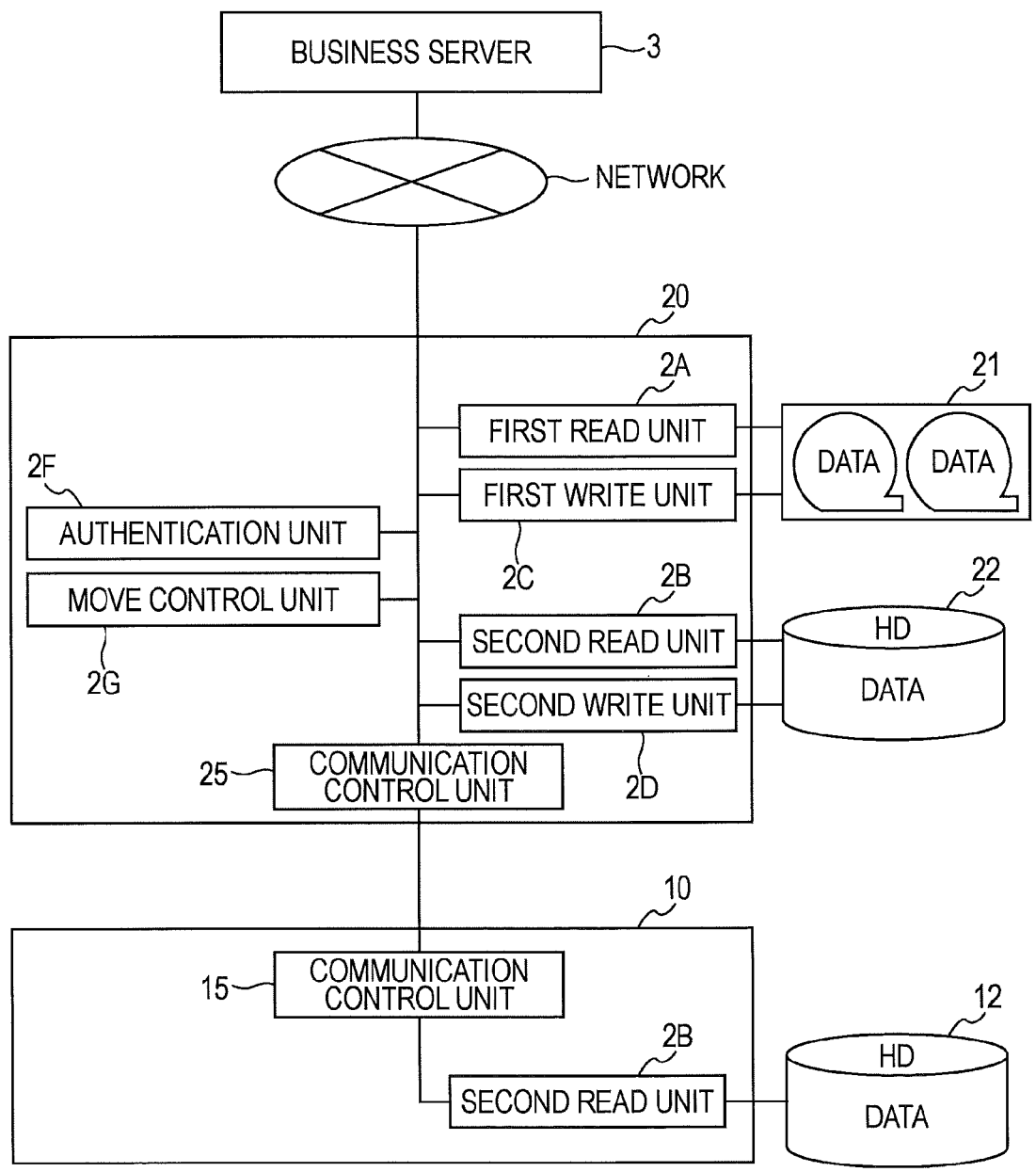
FIG. 11 is a diagram illustrating a state in which a business server is connected with a storage device while data is being moved.

In addition, the storage device 20 may be connected with the business server 3 so as to handle an access request given from the business server 3 while data is being moved as illustrated in FIG. 11.

For example, it is assumed that a request that data which is not yet moved to the second storage medium (unit) 22 on the move destination side be read (hereinafter, referred to as a data read request) has been give from the business server 3 while data is being moved from the second storage medium (unit) 12 on the move source side to the second storage medium 22 on the move destination side. In the above mentioned situation, the move control unit 2G sends the business server 3 the data which has been read out of the second storage medium 12 on the move source side in accordance with the data read request and stores the read data into the second storage medium 22 on the move destination side.

Owing to the above mentioned operations, it becomes possible for the storage device 20 to respond to the data read request given from the business server 3 even while data is being moved and hence the time for which data movement is performed and hence utilization of the storage server 2 is not allowed may be reduced. That is, it becomes possible for the user of the business server 3 to utilize all pieces of data through the storage device 20 immediately after the storage device 20 has been introduced into the system without taking the data moving term into consideration.

In addition, the data which has been read out of the move source is stored in the move destination, so that the read data may be utilized with no waste and the moving speed is hardly reduced even when another process is executed while data is being moved.

Information processing elements of the constitutional elements of the storage devices 10 and 20 according to this embodiment are hardware elements configured such that basic circuits for performing specific operations are combined with one another so as to implement respective functions. In addition, some or all of the elements used to process respective pieces of information may be configured to implement the respective functions by executing software programs using a general purpose computer.

In the storage devices 10 and 20, the first read unit 2A, the second read unit 2B, the first write unit 2C, the second write unit 2D, the table update unit 2E, the authentication unit 2F, the move control unit 2G, the storage unit 233 and the communication control unit 25 are elements for processing the above mentioned respective pieces of information.

Hardware elements for processing the above mentioned pieces of information include basic circuits such as, for example, an FPGA (Field Programmable Gate Array), an ASIC (Application Specific Integrated Circuit) and an LSI (Large Scale Integration). The hardware elements may also include basic circuits such as an IC (Integrated Circuit), a gate array, a logical circuit, a signal processing circuit and an analog circuit.

As examples of the logical circuit, for example, an AND circuit, an OR circuit, a NOT circuit, a NAND circuit, a NOR circuit, a flip-flop circuit and a counter circuit may be given. The signal processing circuit may include circuits for executing, for example, addition, multiplication, division, inversion, sum of product operation, differentiation and integration on signal values. The analog circuit may include circuits for executing, for example, amplification, addition, multiplication, differentiation and integration on signal values.

Incidentally, the present art is not limited to the above mentioned examples illustrated in the drawings and may be modified and altered in a variety of ways without departing from the gist of the present art.

The above mentioned programs may be recorded in a computer readable recording medium. In this respect, the computer readable recording medium is a recording medium of the type of electrically, magnetically, optically, mechanically or chemically storing therein information such as data and programs so as to be read out via a computer. In recording media of the above mentioned type, for example, a flexible disk, a magneto-optic disk, a CD-ROM, a CD-R/W, a DVD, an 8-mm tape, a memory card and others may be given as examples of a recording medium which is detachable from a computer.

In addition, as examples of a recording medium fixed to a computer, a hard disk, a ROM (Read Only Memory) and others may be given.

A system disclosed in the present patent application makes it possible to provide a technique for reducing the time taken for data movement.

As mentioned above, the present art has been specifically described for better understanding of the embodiments thereof and the above description does not limit other aspects of the art. Therefore, the present art can be altered and modified in a variety of ways without departing from the gist and scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An apparatus capable of communicating with another apparatus, the another apparatus including a first writing unit to write data into a recording medium housed in a first housing and which is capable of being taken out of the first housing, a first storage to store cache data of the recording medium housed in the first housing, and a table to manage data stored in the another apparatus, the apparatus capable of communicating with the another apparatus comprising:
    a first reading unit to read out data from a recording medium housed in a second housing, the second housing capable of housing the recording medium housed in the first housing of the another apparatus and taken out of the first housing after the recording medium housed in the first housing of the another apparatus has stored data which was written thereon by the first writing unit of the another apparatus;
    a second reading unit to read out data from the first storage of the another apparatus by communicating with the another apparatus;
    a second storage to store cache data of the recording medium housed in the second housing;
    a determining unit to determine an area of the recording medium housed in the second housing for data to be read out by the first reading unit and an area of the first storage of the another apparatus for data to be read out by the second reading unit in reference to the table;
    a control unit to control, after the recording medium housed in the first housing of the another apparatus is taken out of the first housing and is housed in the second housing,
        the first reading unit to read out data from the recording medium housed in the second housing, on the basis of the determined area of the recording medium housed in the second housing, and
        the second reading unit to read out data from the first storage of the another apparatus, on the basis of the determined area of the first storage; and
    a second writing unit to
        write data read out from the recording medium housed in the second housing by the first reading unit controlled by the control unit into the second storage, and
        write data read out from the first storage of the another apparatus by second reading unit controlled by the control unit into the second storage.

2. The apparatus of claim 1, wherein the first reading unit reads out data from the recording medium housed in the second housing and the second reading unit reads out data from the first storage on the basis of a predetermined ratio.

3. The apparatus of claim 2, wherein the predetermined ratio is set on the basis of a reading speed at which data is read out of recording medium housed in the second housing and a reading speed at which data is read out of the first storage.

4. The apparatus of claim 1, wherein the control unit controls the second reading unit to read out data from the first storage, the data being not stored in the second storage, upon receiving a read request corresponding to the data while data is being moved.

5. A method for use with a first apparatus and a second apparatus, the second apparatus capable of communicating with the first apparatus, the first apparatus including a recording medium housed in a first housing and which is capable of being taken out of the first housing, a first storage to store cache data of the recording medium housed in the first housing, and a table to manage data stored in the first apparatus, the method comprising, after the recording medium housed in the first housing of the first apparatus is taken out of the first housing and is housed in a second housing included in the second apparatus:
    determining an area of the recording medium housed in the second housing of the second apparatus for data to be read out from the recording medium housed in the second housing of the second apparatus and an area of the first storage of the first apparatus for data to be read out from the first storage of the first apparatus, in reference to the table;
    reading out data from the recording medium housed in the second housing of the second apparatus on the basis of the determined area of the recording medium housed in the second housing;

reading out data from the first storage of the first apparatus on the basis of the determined area of the first storage of the first apparatus; and writing the data read out from the recording medium housed in the second housing of the second apparatus and the data read out from the first storage of the first apparatus into a second storage included in the second apparatus and which stores cache data of the recording medium housed in the second housing of the second apparatus.

6. The method of claim 5, wherein the data read out from the recording medium housed in the second housing of the second apparatus and the data read out from the first storage of the first apparatus are read out on the basis of a predetermined ratio.

7. The method of claim 6, wherein the predetermined ratio is set on the basis of a reading speed at which data is read out of the recording medium housed in the second housing of the second apparatus and a reading speed at which data is read out of the first storage of the first apparatus.

8. The method of claim 5, wherein the data is read out from the first storage upon receiving a read request corresponding to the data while data is being moved.

9. A non-transitory computer-readable recording medium that stores a computer program for use with a first apparatus and a second apparatus, the second apparatus capable of communicating with the first apparatus, the first apparatus including a recording medium housed in a first housing and which is capable of being taken out of the first housing, a first storage to store cache data of the recording medium housed in the first housing, and a table to manage data stored in the first apparatus, the program, when executed by a computer, causes the computer to perform, after the recording medium housed in the first housing of the first apparatus is taken out of the first housing and is housed in a second housing included in the second apparatus, a process including:

determining an area of the recording medium housed in the second housing of the second apparatus for data to be read out from the recording medium housed in the second housing of the second apparatus and an area of the first storage of the first apparatus for data to be read out from the first storage of the first apparatus, in reference to the table;

reading out data from the recording medium housed in the second housing of the second apparatus on the basis of the determined area of the recording medium housed in the second housing;

reading out data from the first storage of the first apparatus on the basis of the determined area of the first storage of the first apparatus; and writing the data read out from the recording medium housed in the second housing of the second apparatus and the data read out from the first storage of the first apparatus into a second storage included in the second apparatus and which stores cache data of the recording medium housed in the second housing of the second apparatus.

10. The computer-readable recording medium of claim 9, wherein the data read out from the recording medium housed in the second housing of the second apparatus and the data read out from the first storage of the first apparatus are read out on the basis of a predetermined ratio.

11. The computer-readable recording medium of claim 10, wherein the predetermined ratio is set on the basis of a reading speed at which data is read out of the recording medium housed in the second housing of the second apparatus and a reading speed at which data is read out of the first storage of the first apparatus.

12. The computer-readable recording medium of claim 9, wherein the data is read out from the first storage upon receiving a read request corresponding to the data while data is being moved.

* * * * *

UNITED STATES PATENT AND TRADEMARK OFFICE
CERTIFICATE OF CORRECTION

| | | |
|---|---|---|
| PATENT NO. | : 8,484,429 B2 | Page 1 of 1 |
| APPLICATION NO. | : 12/813595 | |
| DATED | : July 9, 2013 | |
| INVENTOR(S) | : Kunihiko Kassai | |

It is certified that error appears in the above-identified patent and that said Letters Patent is hereby corrected as shown below:

On the Title Page Item (54) and in the Specification, Col. 1 lines 1-2 (Title), Delete "APPARATUS AND METHOD TO COPY DATA VIA A REMOVABLE STORAGE DEVICE" and insert -- APPARATUS CAPABLE OF COMMUNICATING WITH ANOTHER APPARATUS, METHOD OF CONTROLLING APPARATUS AND COMPUTER-READABLE RECORDING MEDIUM --, therefor.

Signed and Sealed this
Tenth Day of December, 2013

Margaret A. Focarino
*Commissioner for Patents of the United States Patent and Trademark Office*